United States Patent
Gaudfrin (10) Patent No.: US 9,878,271 B2
(45) Date of Patent: Jan. 30, 2018

(54) DEVICE FOR REDUCING FRICTION BETWEEN SEALING PLATES OF FILTRATION UNITS, AND USE THEREOF IN A FILTRATION METHOD

(75) Inventor: Guy Gaudfrin, Saint Nom la Breteche (FR)

(73) Assignee: GAUDFRIN, Saint Germain en Laye (FR)

( * ) Notice: Subject to any disclaimer, the term of this patent is extended or adjusted under 35 U.S.C. 154(b) by 0 days.

(21) Appl. No.: 14/345,345

(22) PCT Filed: Sep. 16, 2011

(86) PCT No.: PCT/FR2011/052137
§ 371 (c)(1),
(2), (4) Date: Jun. 27, 2014

(87) PCT Pub. No.: WO2013/038069
PCT Pub. Date: Mar. 21, 2013

(65) Prior Publication Data
US 2014/0311994 A1    Oct. 23, 2014

(51) Int. Cl.
*B01D 25/12*    (2006.01)
*B01D 33/21*    (2006.01)
*B01D 33/48*    (2006.01)
*B01D 33/80*    (2006.01)

(52) U.S. Cl.
CPC ............ *B01D 25/12* (2013.01); *B01D 33/21* (2013.01); *B01D 33/48* (2013.01); *B01D 33/801* (2013.01)

(58) Field of Classification Search
CPC ...................................... B01D 33/82
See application file for complete search history.

(56) References Cited

U.S. PATENT DOCUMENTS 2,352,330 A * 6/1944 Lee ............................... 210/395
2,555,367 A * 6/1951 Peterson ........................ 210/395
(Continued)

FOREIGN PATENT DOCUMENTS

RU    2255791 C    7/2005

OTHER PUBLICATIONS

Office action dated Jul. 21,2015 issued by the Kazakhstan Patent Office for corresponding Kazakh patent application 2014/1546.1 with English translation.
(Continued)

*Primary Examiner* — Krishnan S Menon
*Assistant Examiner* — Ryan B Huang
(74) *Attorney, Agent, or Firm* — Haug Partners LLP (57) ABSTRACT

The present invention relates to a device and a method for reducing friction between two plates (4, 5) of a filtration unit, said plates being rotated relative to one another by being subjected to axial pressing forces, said plates being supported by the longitudinal end of a drum (1) secured to a rotary shaft (3) mounted on a bearing (6) and having internal collectors (11), and the opposite end of a casing (2) which is rotatably locked and supported by said shaft, respectively, characterized in that it includes at least one pulling system (8) engaging with the casing (2) by exerting a force intended to at least partially compensates for the axial forces pressing the plate (5) against the plate (4), in order to reduce friction while ensuring that tight mutual contact is maintained.

10 Claims, 6 Drawing Sheets

(56) References Cited

U.S. PATENT DOCUMENTS 3,471,027 A     10/1969   Emilsson
7,309,218 B1 * 12/2007   Lewis et al. .................. 417/360

OTHER PUBLICATIONS

Office Action issued in corresponding Australian Application No. 2011376706 dated Jul. 20, 2016.
Office Action issued in corresponding European Application No. 11 776 818.4-1370 dated Nov. 22, 2016.

\* cited by examiner

DEVICE FOR REDUCING FRICTION BETWEEN SEALING PLATES OF FILTRATION UNITS, AND USE THEREOF IN A FILTRATION METHOD

This application is a 371 of International Application PCT/FR2011/052137 filed Sep. 16, 2011, the disclosure of which are both incorporated herein by reference.

The present invention relates to a device for reducing friction between sealing plates of filtration units and the use thereof in a filtration method.

The present invention more particularly relates to a device for adjusting the contact pressure between two surfaces respectively embodied by a first plate supported by one of the longitudinal ends of a rotating drum and a second plate supported by the opposite end of a non-deformable stationary box locked in rotation.

Such an arrangement is in particular found in certain liquid-solid vacuum or pressurized separating installations. These installations generally comprise a large drum (diameter sometimes larger than 2 m), containing internal collectors and connected at the periphery to filtering sectors forming discs once they are assembled. This drum is rotated owing to a motorized shaft mounted on bearings and rotated at speeds of up to 5 revolutions per minute. According to one alternative of the installation, the drum does not bear discs and the filtration is done directly on the surface of said drum.

During a rotation of the drum that corresponds to an elementary separating operation, the collectors are successively placed under vacuum (commonly −0.5 relative bar) during the filtering and wiping phases, then under pressure (commonly +0.2 relative bar) during the phase for unsticking cakes of solid material that have accumulated on the sectors.

Thus, in this type of industrial installation, the rotating drum is equipped at one of its ends with a so-called wear plate provided with orifices communicating, through holes formed on a facing plate called distribution plate, successively during the separation cycle, with a suction circuit and a blowing circuit connected on the stationary box.

More specifically, the planar faces of the two plates are in contact to ensure sealing of the system and, during rotation of the drum, the orifices of the wearing plate successively pass in front of the holes of the distribution plate.

In fact, in particular, due to the vacuum generated by the suction circuit in the stationary box and the internal collectors of the drum in the filtration phase, the wear and distribution plates are subjected to a pressing force leading to pressing them against one another and establishing a contact pressure ensuring peripheral and central sealing, but generating significant friction between the surfaces of the opposite plates.

This pressing force depends on the ratio between the pressing surface and the pressed surface, which in this field is approximately from 3-to-4, with the understanding that the surfaces of the plates in contact are primarily the solid parts on the periphery and the center to ensure sealing of the system with respect to the outside, as well as the solid parts between the orifices and the holes.

In the context of pressurized filtration, the filtration system is placed in a pressurized enclosure. The pressure difference between the outside and the inside of the assembly formed by the box and the drum may be up to 20 times greater than that of the system under vacuum. The contact pressure between the plates will therefore be increased in proportion.

The evolution of filtration needs, and in particular the demand by industrialists for greater processing capacities, is leading on the one hand to an increase in the sizes of solid-liquid separating installations, and therefore the diameter of the plates, and on the other hand, in order to improve productivity, to increasing speeds of rotation. In light of the description of the system, it is clear that the larger the dimensions, speed of rotation and vacuum level are, the greater the friction is between the plates and, consequently, the faster they wear out.

Furthermore, the more friction there is between the plates, the higher the torque and power necessary to drive the drum are, which poses energy problems.

Typically, if the vacuum level in the collector during vacuum filtration is approximately −0.5 relative bar, the contact pressure will reach at least 1.2 bars. In the case of pressurized filtration, the pressure of the air around the box and the drum may be greater than 6 relative bar, the pressure inside the box and the drum being equal to the atmospheric pressure, the contact pressure will then reach more than 18 bars.

The present invention aims to resolve these technical problems in a satisfactory and effective manner by proposing a solution making it possible to reduce the contact pressure between the plates without breaking the sealing of their connection.

This aim is achieved according to the invention using a device characterized in that it comprises at least one traction system acting on the box by exerting a force, in a direction opposite the pressing force due to the vacuum of the distribution plate, on the wear plate, thereby reducing the contact pressure between the surfaces of the plates, and consequently the friction, while ensuring maintenance of mutual sealing contacts.

Owing to the traction system, the device according to the invention thus makes it possible to at least partially offset the axial forces pressing the two plates against each other.

According to one advantageous feature, said traction system is subjugated to the pressure difference between the inside and the outside of the assembly formed by the drum and the box.

Advantageously, said box includes side passages equipped with flexible pipes connecting to the suction and blowing circuits to avoid uncontrolled stresses on the box.

According to still another feature, said box is provided with a central sleeve mounted around said rotating shaft, and on the other hand, with rotational locking means.

According to one alternative, said traction system is mounted pressing on the stationary bearing supporting said rotating shaft or on a stationary housing.

According to another alternative, said traction system comprises at least one pneumatic cylinder capable of producing forces in a direction opposite said axial forces.

In that case, for a vacuum filter, said cylinder is mounted coaxially in the extension of said rotating shaft and applies a force on a ribbed central plate providing the connection with tie rods connected to the box and parallel to said shaft.

Preferably, said box can slide on said rotating shaft to allow bearing contact of the distribution plate on the wear plate, irrespective of the loss of thickness of said wear plate during operation.

The device according to the invention makes it possible to offer precise adjustment of the contact pressure between the plates and thereby minimize the friction forces. This results in less wear of the plate of the box.

The regulation and stability of the contact pressure between the plates can be provided by the device according to the invention owing to the subjugation of the force exerted by the traction system on the box to the pressure difference between the inside and the outside of the assembly formed by the drum and the box, if applicable, by associating reducing members such as lever arms therewith.

According to one advantageous feature, this subjugation is done for the vacuum or pressurized filtration by using passages to place the chambers of the cylinder, or cylinders if there are several, of the traction system in contact with the air inside and outside the assembly formed by the drum and the box. The force provided by the cylinder will then be proportional to the pressure difference.

The use of the device according to the invention in the context of a liquid-solid separating method, in particular in a subjugated operating mode, allows an optimal increase in the size and capacity of industrial filtration units without additional maintenance problems appearing at the moving elements and while controlling the drive torques.

The invention will be better understood upon reading the following description, accompanied by drawings, in which.

The device according to the invention as shown in the different figures is intended to adjust the contact pressure between two surfaces respectively supported by a rotating drum 1 (partially shown in the figures) and a box 2 mounted in the longitudinal extension of the drum 1.

The box 2 is locked in rotation while retaining the possibility of sliding along the drive shaft 3.

The drive shaft 3 is secured to a drum 1 while being fastened here to a central hub 13.

Figure 1:
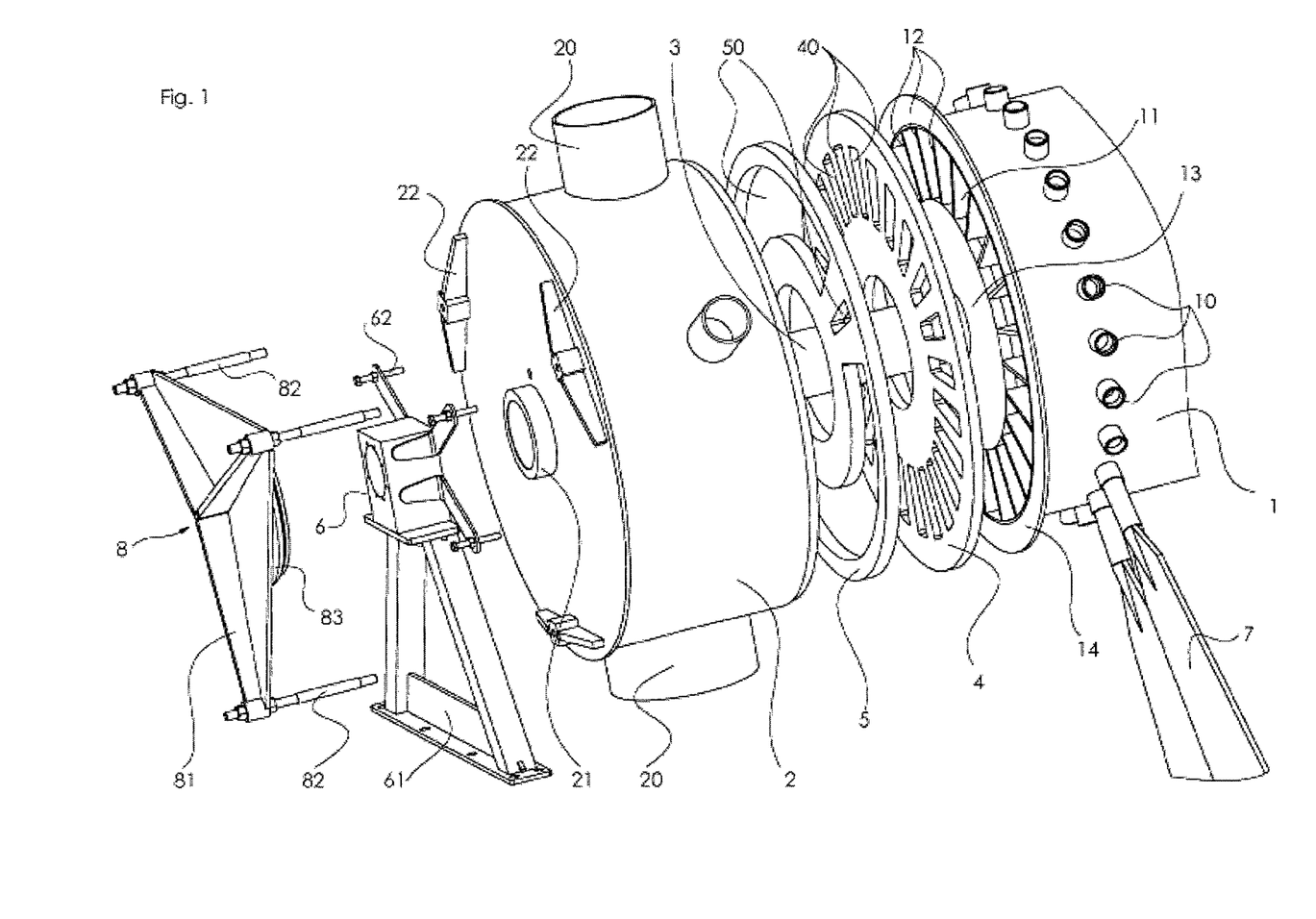
FIG. 1 shows an exploded perspective view of one embodiment of the device according to the invention on a vacuum disc filter with a wave cylinder operating under pressure.
Figure 2:
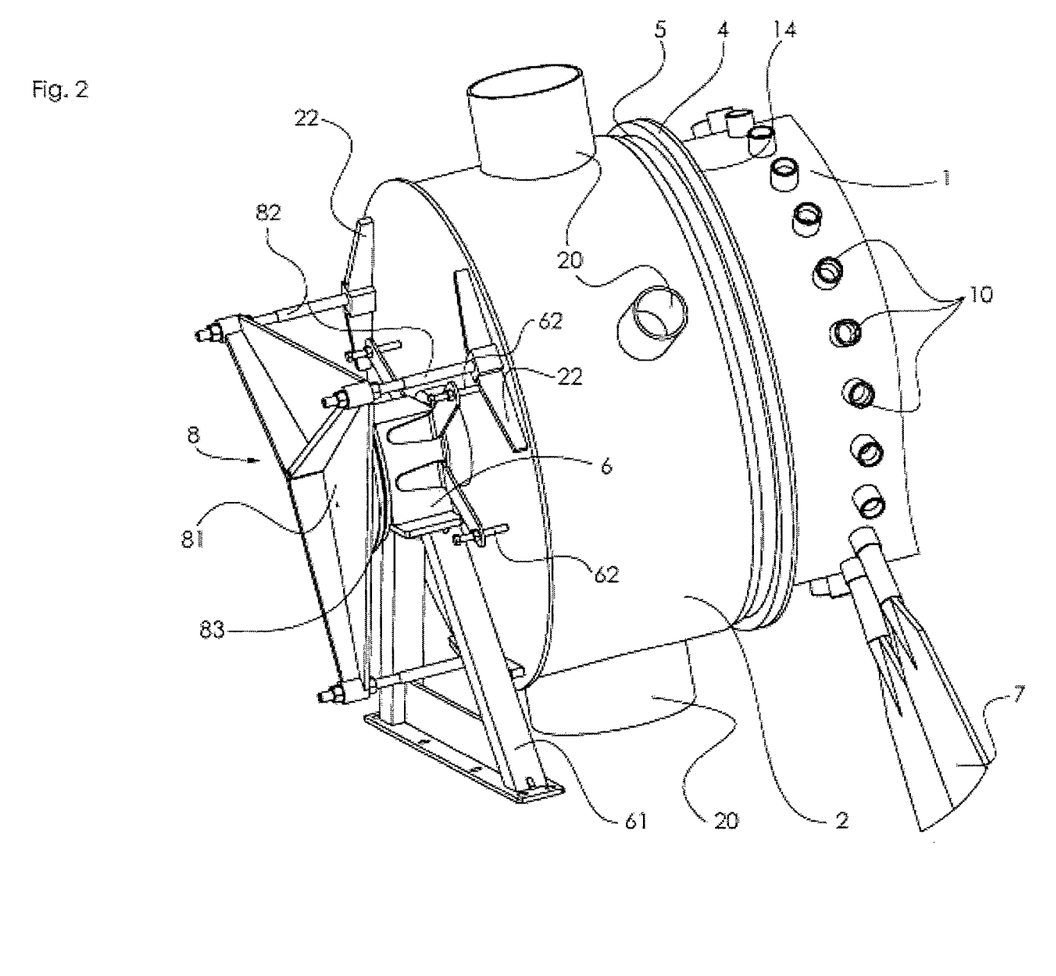
FIG. 2 shows a perspective view of the embodiment of FIG. 1 in the assembled position.
Figure 4:
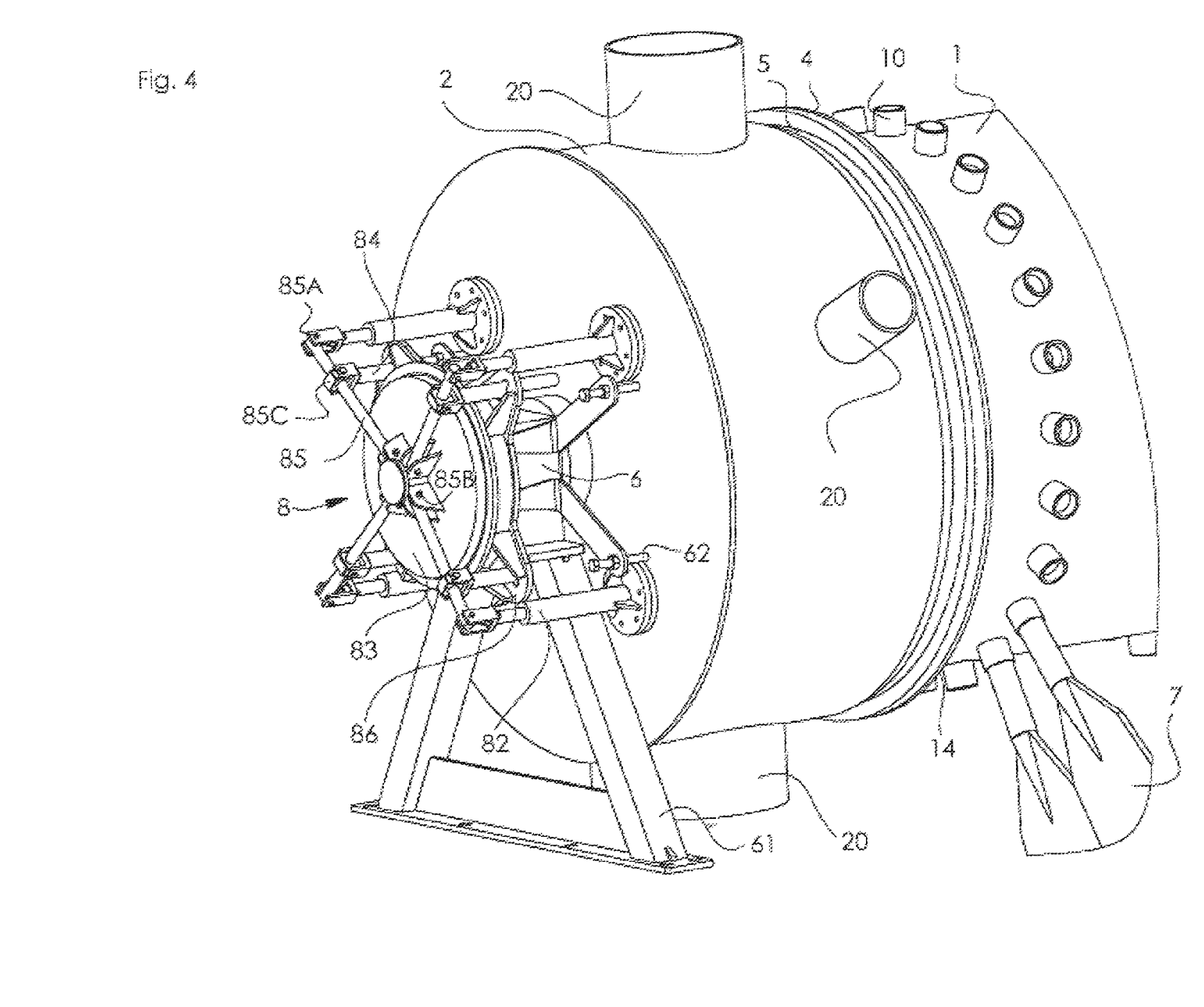
FIG. 4 shows a perspective view of another embodiment of the device according to the invention making it possible to subjugate the force exerted by the traction system to the vacuum level of a vacuum disc filter, precisely and without measuring instruments.

The drum 1, in this embodiment, bears discs formed by filtering sectors 7 connected to the drum 1 by tubings 10. Only two filtering sectors 7 are shown in FIGS. 1, 2 and 4.

The inner volume of the drum 1 is split into multiple compartments forming the collectors 11 that are designed to recover the filtrate.

The collectors here are separated by radial inner partitions 12.

During the filtration phase of the separating cycle, the collectors 11 are placed under vacuum, then conversely, during the unclogging phase of the sectors 7, the collectors are placed in an overpressure to unstick the cakes of solid material that have been previously deposited. This cycle is generally carried out during a complete revolution of the drum 1.

At one of the longitudinal ends of the collectors 11 of the drum 1, a cylindrical plate 4 called a wear plate (since it may lose thickness and therefore be replaced) is positioned, which here is several centimeters thick. The plate 4 bears on the field of the partitions 12 and is removably fastened on a flange 14, which in turn is supported by the periphery of the drum 1.

The plate 4 is provided with orifices 40 formed on its surface and positioned across from each collector 11, as illustrated by FIG. 1.

The box 2 includes a central sleeve 21 mounted coaxially on the drive shaft 3 that supports it.

The box is immobilized by rotational locking means (for example of the stop type, not shown), and it is provided that the sleeve 21 can nevertheless slide along the shaft 3 over a travel of approximately several centimeters.

On the side wall of the box 2 across from the drum 1, said box receives a cylindrical attached plate 5 called distributing plate, as it puts the collectors 11 of the shaft in alternating communication with vacuum and overpressure circuits relative to the pressure prevailing outside the assembly formed by the box 2 and the drum 1.

The rods 62, connected to the bearing 6 by spring blades, push on the box 2 in order to pre-press the plate 5 against the plate 4 before starting the filtration method.

The plate 5 is provided with holes 50. In the case of vacuum filtration (FIGS. 1 to 5), these holes 50 are the outlets of the suction and blowing circuits (not shown) designed to respectively and successively establish a vacuum and an overpressure in the collectors 11 of the drum.

The box 2 further includes side passages 20 that may be equipped with flexible pipes (not shown) for connecting to the suction and blowing circuits and emerging in the two chambers sharing the inner volume of the box 2 and communicating, via the holes 50 of the plate 5 and the orifices 40 of the plate 4, with the collectors 11 of the drum 1.

Figure 6:
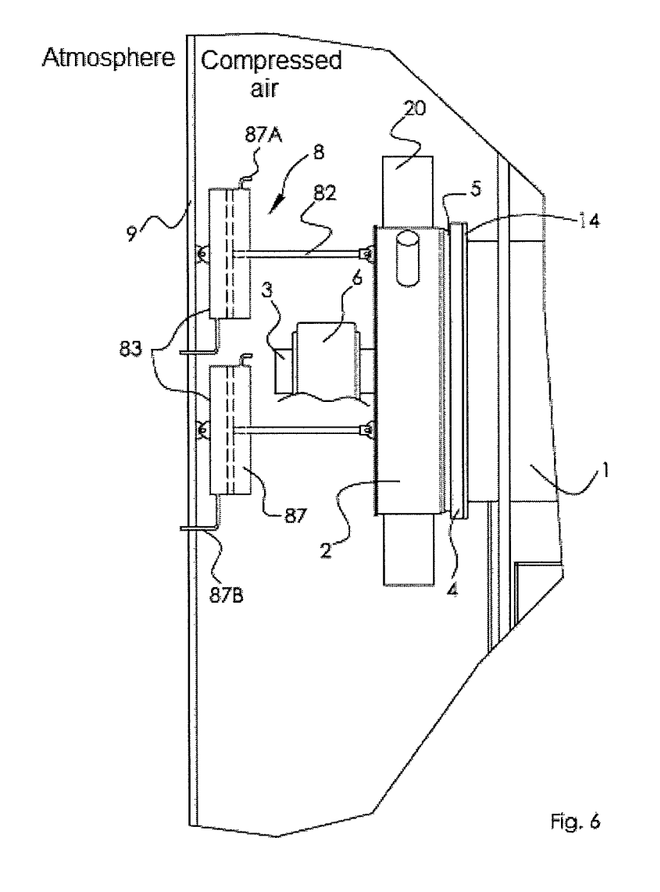
FIG. 6 shows a diagrammatic view of the embodiment of the device according to the invention on a pressurized disc filter whereof the traction system comprises three pneumatic cylinders with a small diameter.
Figure 7:
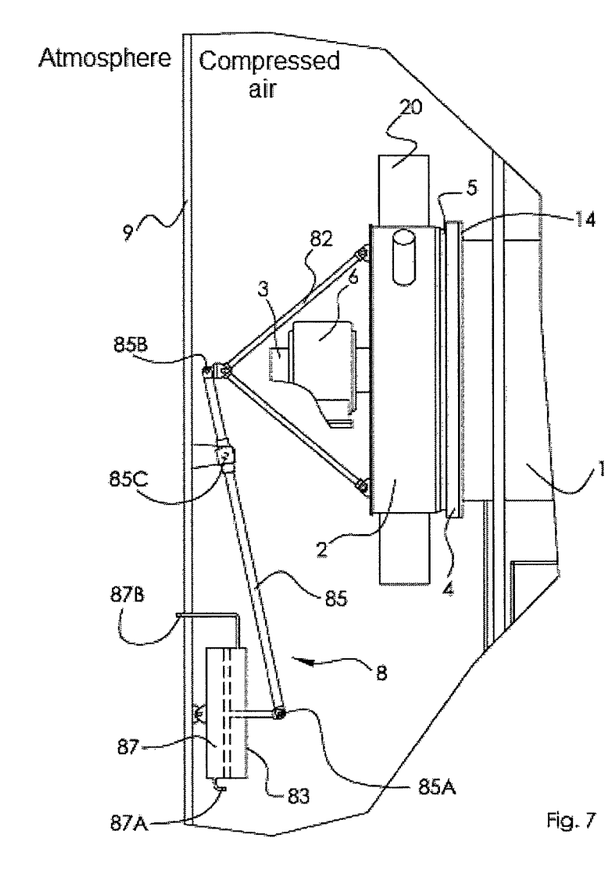
FIG. 7 shows a diagrammatic view of one alternative embodiment of FIG. 6 with a single pneumatic cylinder with a small diameter exerting the same traction force on the box using a lever arm.

For the alternative with pressurized filtration, shown in FIGS. 6 and 7, the suction circuit previously described is replaced by a circuit for creating atmospheric pressure inside the assembly formed by the drum 1 and the box 2, ensuring the pressure difference with respect to the compressed air of a pressurized enclosure 9.

During the filtration phase, under the effect of the pressure difference between the inside and outside of the assembly formed by the box 2 and the drum 1, the plate 5 and the box 2, which are free to slide on the shaft, are subjected to axial pressing forces oriented toward the plate 4 and the opposite rotating drum.

These forces, the intensity of which is proportional to the pressure difference between the inside and the outside of the assembly formed by the box and the drum, cause pressing and sealing bearing of the stationary plate 5 against the rotating plate 4. This results in significant friction between the plates 5 and 4, which in turn is proportional to the contact pressure and therefore the pressure difference.

To reduce this friction, the invention provides for using at least one traction system acting on the box 2, which is not deformable, and therefore on the distribution plate 5 by exerting a force designed to at least partially compensate the axial forces that press the distribution plate 5 on the wear plate 4. The traction system thus reduces the contact pressure between the plates and therefore the friction, while ensuring maintenance of a sealed mutual contact.

In the case of vacuum filtration (FIGS. 1 to 5), the traction system is mounted on the bearing 6 of the drive shaft 3 supported by the stationary housing 61.

Figure 3:
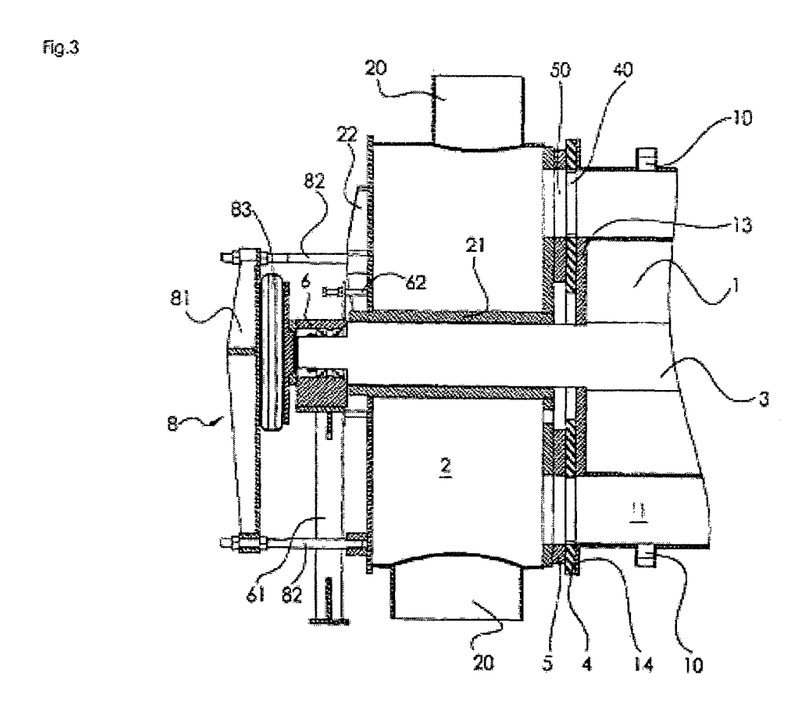
FIG. 3 shows a side cross-sectional view of the embodiment of FIGS. 1 and 2.

The traction system 8 shown in FIGS. 1 to 3 comprises at least one cylinder 83, here pneumatic or, according to another alternative, a hydraulic cylinder or even a spring, capable of producing forces in a direction opposite the forces pressing the distribution plate 5 on the wear plate 4.

In FIGS. 1 to 3, the cylinder 83 is mounted on the bearing 6 coaxially in the extension of the rotating shaft 3 and applies a force on a ribbed central plate 81 providing the connection with tie rods 82 parallel to the shaft 3 and the ends of which are connected to the outer side wall of the box 2 locally reinforced by brackets 22, as shown in FIGS. 2 and 3.

Preferably, the force exerted by the cylinder 83 is subjugated to the level prevailing in the inner volume of the box 2 and the collectors 11 of the drum 1 so as to obtain an automatic, fine and optimal adjustment of the contact pressure between the plates irrespective of the variations in the vacuum level caused by the changes of state of the vacuum circuits.

Figure 5:
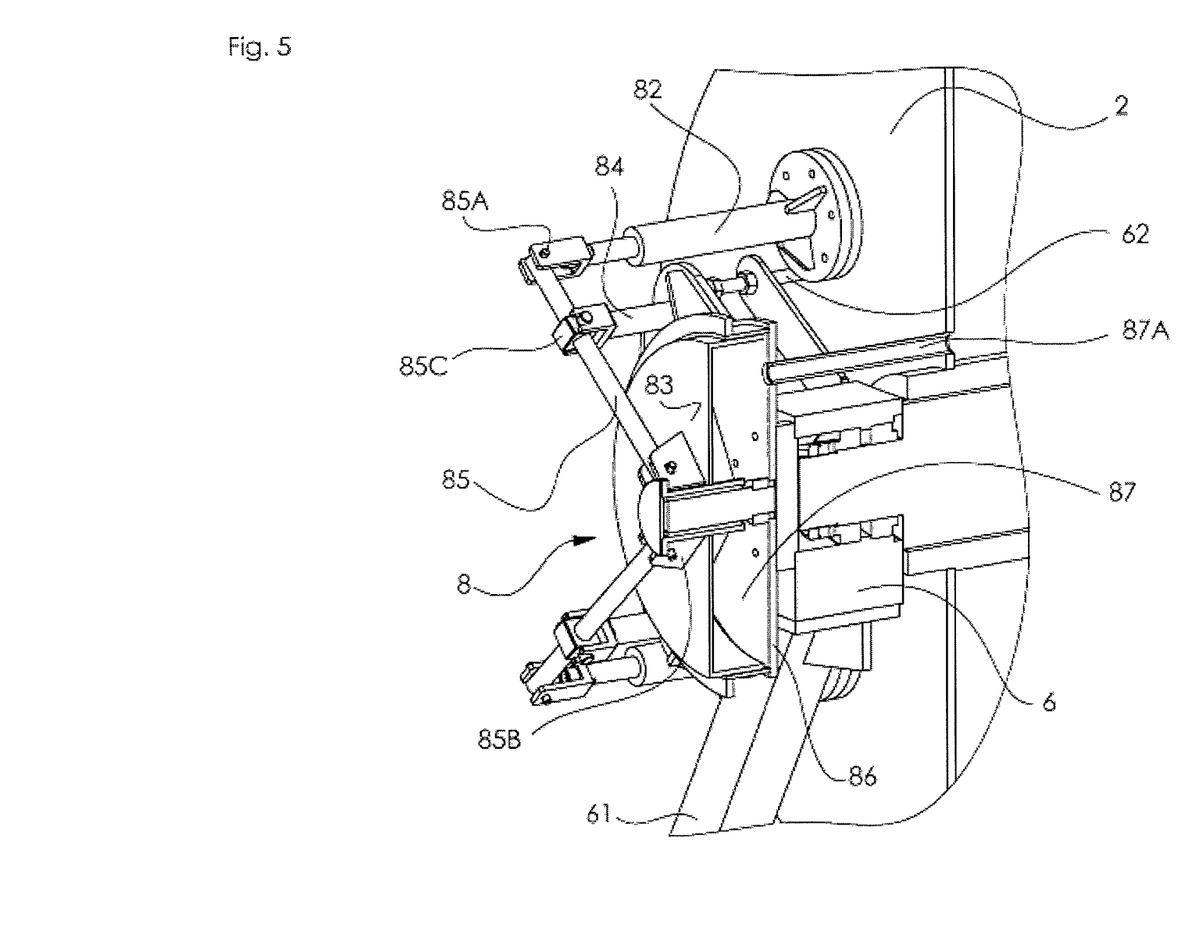
FIG. 5 shows a perspective view of a side cross-section of the embodiment of FIG. 4.

According to one alternative shown in FIGS. 4 and 5, an effort is made to obtain a subjugation perfectly proportional to the operating vacuum level of the force exerted by the cylinder 83. To that end, the chamber 87 of the pneumatic cylinder 83, shown in FIG. 5, is put in communication with the inside of the box 2 using a passage 87A. The piston of the cylinder 83, subject to the operating vacuum, pulls on lever arms 85 proportionally to said vacuum. The force provided by the cylinder 83 is transmitted by the lever arm 85 to the tie rods 82, which makes it possible to exert traction, continuously subjugated to the vacuum, on the box 2 and therefore on the plate 5.

Said lever arms 85 are connected to the piston of the cylinder 83 by sliding pivot links 85B and to the tie rods 82 by the pivot links 85A. The force transmitted by the lever depends on the position of the sliding pivot link 85C between the lever arm 85 and the bearing column of the lever 84. By adjusting the position of the bearing column of the lever 84 supported by the base 86 of the cylinder 83, which in turn is mounted on the bearing 6, it is possible to adjust the traction force exerted on the box 2 and therefore on the plate 5.

The effect of the lever arms 85 multiplies the force provided by the cylinder 83 enough to offset the action of the vacuum on the plate 5 with a cylinder 83 that is small relative to the size of the box 2.

According to another alternative, shown in FIGS. 6 and 7, the filtration is done under pressure and the force exerted by the traction system 8 is subjugated, precisely and without measuring instruments, to the pressure difference between the inside and the outside of the assembly formed by the box 2 and the drum 1. The filter comprises the same elements 1 to 7 as the vacuum filters previously described, but is contained in a pressurized enclosure 9.

In the cases shown in FIGS. 6 and 7, the chambers 87 of the pneumatic cylinders 83 are put in communication on the one hand with the compressed air of the pressurized enclosure 9 through the passages 87A and on the other hand with the air at atmospheric pressure outside the enclosure 9 through the passages 87B. In this way, the force provided by the cylinders 83 will be continuously proportional to the pressure difference between the outside and the inside of the assembly formed by the box 2 and the drum 1.

For bulk reasons, several cylinders 83, which are small relative to the box 2, will generally be required, as shown in FIG. 6, where the traction system comprises three cylinders 83. In FIG. 6, the cylinders 83 are connected to the wall of the pressurized enclosure 9 and the pistons are connected to the tie rods 82.

In that case, the three pneumatic cylinders 83 will be the same size and subjected to the same pressure difference; they will therefore provide an identical traction force, which make it possible to compensate the axial pressing forces pressing the distribution plate 5 against the wear plate 4.

According to another configuration of the traction system shown in FIG. 7, a single pneumatic cylinder 83 with small dimensions relative to the box 2 will, by pushing on a lever arm 85 at the pivot link 85B, provide the necessary traction force on the pivot link 85A of the lever 85 with the tie rods 82 to offset the pressing forces pressing the distribution plate 5 on the wear plate 4.

In this configuration, the adjustment of the position of the support for the sliding pivot link 85C will make it possible to adjust the force exerted by the traction system on the box 2.

The invention claimed is:

1. A device for reducing the friction between two plates of a filtration unit, driven in relative rotation while being subjected to axial forces, the device comprising:
    a first plate mounted on a longitudinal end of a drum that is secured to a rotating shaft mounted on a bearing, the drum having internal collectors,
    a second plate mounted on an end of a box that is locked in rotation and supported by said shaft, the second plate external to the box and facing the first plate, the box being translatable along an axis of the shaft, and
    at least one traction system acting on the box,
    wherein a gas pressure inside the drum and box is lower than a pressure outside the drum and box creating an axial force in a first direction pressing the second plate towards the first plate,
    wherein said at least one traction system comprises at least one pneumatic cylinder capable of producing a force transmitted to tie rods for exerting on said box a force in a direction opposite said axial force to at least partially compensate for the axial force to reduce a frictional force between the first and second plates while ensuring maintenance of a mutual sealing contact between said plates.

2. The device according to claim 1, wherein said plates are respectively provided for orifices communicating with the collectors of the drum for one, and holes corresponding to the suction and blowing circuits to establish the vacuum/overpressure in the collectors of the drum relative to the pressure outside the drum for the other.

3. The device according to claim 2, wherein said traction system comprises a linkage for communicating the force opposed to the axial force pressing the second plate in the first direction toward the first plate exerted by the traction system is proportional to a pressure difference between the inside and the outside of the box and drum.

4. The device according to claim 1, wherein said box includes side passages equipped with flexible pipes for connecting to suction and blowing circuits.

5. The device according to claim 1, wherein said box is provided with a central sleeve able to slide around said rotating shaft.

6. The device according to claim 1, wherein the traction system is mounted on the bearing of said rotating shaft.

7. The device according to claim 1, wherein said cylinder is mounted coaxially in the extension of said rotating shaft and exerts a force on a ribbed central plate providing a connection with the tie rods parallel to said shaft whereof an end of the tie rods is connected to said box.

8. The device according to claim 1, comprising lever arms designed to transmit the force provided by the cylinder of the traction system to the tie rods to minimize the diameter of the cylinder.

9. A use of the device according to claim 1 for vacuum filtration, wherein a chamber of the pneumatic cylinder of said traction system is put in communication with the box under vacuum through a passage, precisely and continuously subjugating the force provided by the cylinder to the vacuum level inside the box.

10. A use of the device according to claim 1 for pressurized filtration, wherein the chamber of the pneumatic cylinder of the traction system are placed in communication with the compressed air of a pressurized enclosure through passages and with the air at atmospheric pressure outside said enclosure through passages continuously subjugating the force provided by the cylinders to the pressure prevailing inside said enclosure.

* * * * *